(12) United States Patent
Boyle et al.

(10) Patent No.: US 10,807,009 B2
(45) Date of Patent: Oct. 20, 2020

(54) VIDEO GAME RIDE

(71) Applicant: Universal City Studios LLC, Universal City, CA (US)

(72) Inventors: Patrick Devin Boyle, Orlando, FL (US); Ross Alan Osterman, Winter Park, FL (US)

(73) Assignee: Universal City Studios LLC, Universal City, CA (US)

( * ) Notice: Subject to any disclaimer, the term of this patent is extended or adjusted under 35 U.S.C. 154(b) by 1 day.

(21) Appl. No.: 16/185,709

(22) Filed: Nov. 9, 2018

(65) Prior Publication Data

US 2019/0076744 A1 Mar. 14, 2019

Related U.S. Application Data

(62) Division of application No. 14/498,357, filed on Sep. 26, 2014, now Pat. No. 10,238,979.

(51) Int. Cl.
*A63G 25/00* (2006.01)
*A63F 13/65* (2014.01)
*A63F 13/69* (2014.01)
*A63F 13/28* (2014.01)
*A63F 13/27* (2014.01)

(52) U.S. Cl.
CPC .............. *A63G 25/00* (2013.01); *A63F 13/28* (2014.09); *A63F 13/65* (2014.09); *A63F 13/69* (2014.09); *A63F 13/27* (2014.09)

(58) Field of Classification Search
CPC ......... A63G 25/00; A63F 13/28; A63F 13/65; A63F 13/69; A63F 13/27
See application file for complete search history.

(56) References Cited

U.S. PATENT DOCUMENTS

| 4,254,433 A | 3/1981 | Dewar, Jr. et al. |
| 4,662,756 A | 5/1987 | Duran, Jr. |

(Continued)

FOREIGN PATENT DOCUMENTS

| CN | 1915470 | 2/2007 |
| EP | 0479422 A2 | 4/1992 |

(Continued)

OTHER PUBLICATIONS

CN 201580064474.5 Office Action dated Oct. 12, 2018.

(Continued)

*Primary Examiner* — David L Lewis
*Assistant Examiner* — Shauna-Kay Hall
(74) *Attorney, Agent, or Firm* — Fletcher Yoder PC

(57) ABSTRACT

A system in accordance with present embodiments includes a plurality of vehicles having vehicle interface circuitry and configured to accommodate one or more riders. In certain embodiments, a vehicle of the plurality of vehicles is configured to receive respective inputs from the one or more riders via the vehicle interface circuitry, and wherein the respective inputs are related to one or more game features of a game environment; and a game controller configured to receive information from the vehicle interface circuitry related to the respective inputs; and provide instructions to modify the game environment based on at least one of the respective inputs.

17 Claims, 8 Drawing Sheets

(56) References Cited

U.S. PATENT DOCUMENTS

| | | | |
|---|---|---|---|
| 5,127,657 A * | 7/1992 | Ikezawa | A63F 9/0291 |
| | | | 434/21 |
| 5,403,238 A * | 4/1995 | Baxter | A63G 31/16 |
| | | | 104/78 |
| 5,682,331 A | 10/1997 | Berlin | |
| 5,716,281 A | 2/1998 | Dote | |
| 5,906,542 A | 5/1999 | Neumann | |
| 6,159,100 A | 12/2000 | Smith | |
| 6,176,837 B1 | 1/2001 | Foxlin | |
| 6,220,965 B1 * | 4/2001 | Hanna | A63G 7/00 |
| | | | 463/52 |
| 6,474,159 B1 | 11/2002 | Foxlin et al. | |
| 6,665,079 B1 | 12/2003 | Tocci et al. | |
| 6,761,637 B2 | 7/2004 | Weston et al. | |
| 6,784,826 B2 | 8/2004 | Kane et al. | |
| 6,796,908 B2 * | 9/2004 | Weston | A63G 7/00 |
| | | | 434/55 |
| 6,831,603 B2 | 12/2004 | Menache | |
| 6,967,566 B2 | 11/2005 | Weston et al. | |
| 7,089,148 B1 | 8/2006 | Bachmann et al. | |
| 7,184,022 B2 | 2/2007 | Xie et al. | |
| 7,257,237 B1 | 8/2007 | Luck et al. | |
| 7,307,617 B2 | 12/2007 | Wilson et al. | |
| 7,356,172 B2 | 4/2008 | Fan et al. | |
| 7,395,181 B2 | 7/2008 | Foxlin | |
| 7,445,550 B2 | 11/2008 | Barney et al. | |
| 7,500,917 B2 | 3/2009 | Barney et al. | |
| 7,502,126 B2 | 3/2009 | Ong | |
| 7,505,033 B2 | 3/2009 | Guo et al. | |
| 7,519,537 B2 | 4/2009 | Rosenberg | |
| 7,618,323 B2 | 11/2009 | Rothschild et al. | |
| 7,623,115 B2 | 11/2009 | Marks | |
| 7,704,135 B2 | 4/2010 | Harrison, Jr. | |
| 7,755,608 B2 | 7/2010 | Chang et al. | |
| 7,775,439 B2 | 8/2010 | Kimber et al. | |
| 7,850,527 B2 | 12/2010 | Barney et al. | |
| 7,854,655 B2 | 12/2010 | Mao et al. | |
| 7,863,551 B2 | 1/2011 | Bang et al. | |
| 7,874,918 B2 | 1/2011 | Osnato et al. | |
| 7,896,742 B2 | 3/2011 | Weston et al. | |
| 7,905,769 B1 | 3/2011 | Harrison, Jr. | |
| 7,918,733 B2 | 4/2011 | Zalewski et al. | |
| 7,927,216 B2 | 4/2011 | Ikeda et al. | |
| 7,955,168 B2 | 6/2011 | Mendelsohn et al. | |
| 7,996,793 B2 | 8/2011 | Latta et al. | |
| 8,058,975 B2 | 11/2011 | Barnardo et al. | |
| 8,248,367 B1 | 8/2012 | Barney et al. | |
| 2001/0034257 A1 | 10/2001 | Weston et al. | |
| 2002/0169013 A1 | 11/2002 | Serizawa | |
| 2003/0069077 A1 | 4/2003 | Koreienek et al. | |
| 2003/0106455 A1 | 6/2003 | Weston | |
| 2004/0075677 A1 | 4/2004 | Loyall et al. | |
| 2004/0113887 A1 | 6/2004 | Pair et al. | |
| 2004/0166937 A1 | 8/2004 | Kopera et al. | |
| 2005/0143173 A1 | 6/2005 | Barney et al. | |
| 2006/0030385 A1 | 2/2006 | Barney et al. | |
| 2006/0154726 A1 | 7/2006 | Weston et al. | |
| 2006/0256081 A1 | 11/2006 | Zalewski et al. | |
| 2006/0282873 A1 | 12/2006 | Zalewski et al. | |
| 2006/0287030 A1 | 12/2006 | Briggs et al. | |
| 2006/0287087 A1 | 12/2006 | Zalewski et al. | |
| 2006/0293110 A1 * | 12/2006 | Mendelsohn | A63G 1/00 |
| | | | 472/137 |
| 2007/0010306 A1 * | 1/2007 | Kanno | A63F 13/10 |
| | | | 463/6 |
| 2007/0060229 A1 | 3/2007 | Okada et al. | |
| 2007/0089632 A1 | 4/2007 | Gordon | |
| 2007/0259594 A1 | 11/2007 | Galbiati et al. | |
| 2007/0265075 A1 | 11/2007 | Zalewski | |
| 2008/0013826 A1 | 1/2008 | Hillis et al. | |
| 2008/0014835 A1 | 1/2008 | Weston et al. | |
| 2008/0096654 A1 | 4/2008 | Mondesir et al. | |
| 2008/0244468 A1 | 10/2008 | Nishihara et al. | |
| 2008/0268943 A1 * | 10/2008 | Jacob | G06F 3/04815 |
| | | | 463/23 |
| 2009/0051653 A1 | 2/2009 | Barney et al. | |
| 2009/0115721 A1 | 5/2009 | Aull et al. | |
| 2009/0121894 A1 | 5/2009 | Wilson et al. | |
| 2009/0124165 A1 | 5/2009 | Weston | |
| 2009/0125161 A1 * | 5/2009 | Baur | G09B 19/16 |
| | | | 701/1 |
| 2009/0191968 A1 | 7/2009 | Johnson et al. | |
| 2009/0215534 A1 | 8/2009 | Wilson et al. | |
| 2009/0293110 A1 * | 11/2009 | Koga | G09C 5/00 |
| | | | 726/6 |
| 2009/0316952 A1 | 12/2009 | Ferren et al. | |
| 2010/0050133 A1 | 2/2010 | Nishihara et al. | |
| 2010/0134308 A1 | 6/2010 | Barnardo et al. | |
| 2010/0192007 A1 | 7/2010 | Tarra et al. | |
| 2010/0194762 A1 | 8/2010 | Latta et al. | |
| 2010/0199228 A1 | 8/2010 | Latta et al. | |
| 2010/0199230 A1 | 8/2010 | Latta et al. | |
| 2010/0281436 A1 | 11/2010 | Kipman et al. | |
| 2010/0304868 A1 | 12/2010 | Zalewski | |
| 2010/0306712 A1 | 12/2010 | Snook et al. | |
| 2010/0306714 A1 | 12/2010 | Latta et al. | |
| 2010/0306715 A1 | 12/2010 | Geisner et al. | |
| 2010/0306716 A1 | 12/2010 | Perez | |
| 2011/0081970 A1 | 4/2011 | Barney et al. | |
| 2011/0118021 A1 | 5/2011 | Zalewski | |
| 2011/0151974 A1 | 6/2011 | Deaguero | |
| 2015/0360127 A1 | 12/2015 | Boyle | |

FOREIGN PATENT DOCUMENTS

| | | |
|---|---|---|
| JP | 03123579 | 5/1991 |
| JP | 2002-035419 | 2/2002 |
| JP | 2002-126359 | 5/2002 |
| RU | 18235 U1 | 6/2001 |

OTHER PUBLICATIONS

International Search Report in PCT/US2015/050406 dated Dec. 23, 2015.

SG 11201702184Q Written Opinion and Search Report dated Jan. 8, 2018.

RU Decision of Grant dated Oct. 18, 2018.

JP 2019-004570 Office Action dated Jul. 29, 2019.

* cited by examiner

VIDEO GAME RIDE

CROSS REFERENCE TO RELATED APPLICATIONS

This application is a divisional of U.S. patent application Ser. No. 14/498,357, filed Sep. 26, 2014, the entire disclosure of which is incorporated herein by reference in its entirety.

FIELD OF DISCLOSURE

The present disclosure relates generally to the field of amusement parks. More specifically, embodiments of the present disclosure relate to methods and equipment used in conjunction with amusement park games or rides.

BACKGROUND

Since the early twentieth century, amusement parks (or theme parks) have substantially grown in popularity. Certain rides may provide an immersive experience for the visitor. For example, a series of vehicles may drive riders through rooms with various features, including audio, video, and special effects features. These features may also relate to the theme of the ride. With the increasing sophistication and complexity of modern ride attractions, and the corresponding increase in expectations among theme or amusement park patrons, improved and more creative ride attractions are needed, including ride attractions having more complex vehicle options and features that relate to a ride theme.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a plurality of vehicles configured to accommodate one or more riders, each vehicle associated with a game character and having vehicle interface circuitry, wherein each vehicle of the plurality of vehicles is configured to receive respective inputs from the one or more riders via the vehicle interface circuitry, and wherein the respective inputs are related to one or more game features of a game environment. The system also includes a game controller configured to receive information from the vehicle interface circuitry related to the respective inputs; and provide instructions to modify the game environment or a path of one or more of the plurality of game vehicles based on at least one of the respective inputs, wherein the respective inputs are related to game features associated with the game character, wherein modifying the game environment comprises modifying a virtual or physical object within the game.

In another embodiment, a method includes receiving one or more inputs from a plurality of vehicles in a game environment; assigning scores or game narratives to each individual vehicle based on the one or more inputs; assigning a vehicle path within the game environment to each individual vehicle of the plurality of vehicles based on the score or game narrative of the respective individual vehicle; and transmitting information related to the respective vehicle path to the corresponding individual vehicles.

In another embodiment, a controller includes a memory. The memory stores instructions that when executed, are configured to access a first setting of a game environment; provide instructions to activate the first setting of the game environment; receive one or more inputs from individual vehicles in the game environment; access a second setting of the game environment based on the one or more inputs; and provide instructions to activate the second setting of the game environment, wherein the first setting is associated with a first location in the game environment and the second setting is associated with a second location in the game environment; and a processor configured to execute the instructions.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
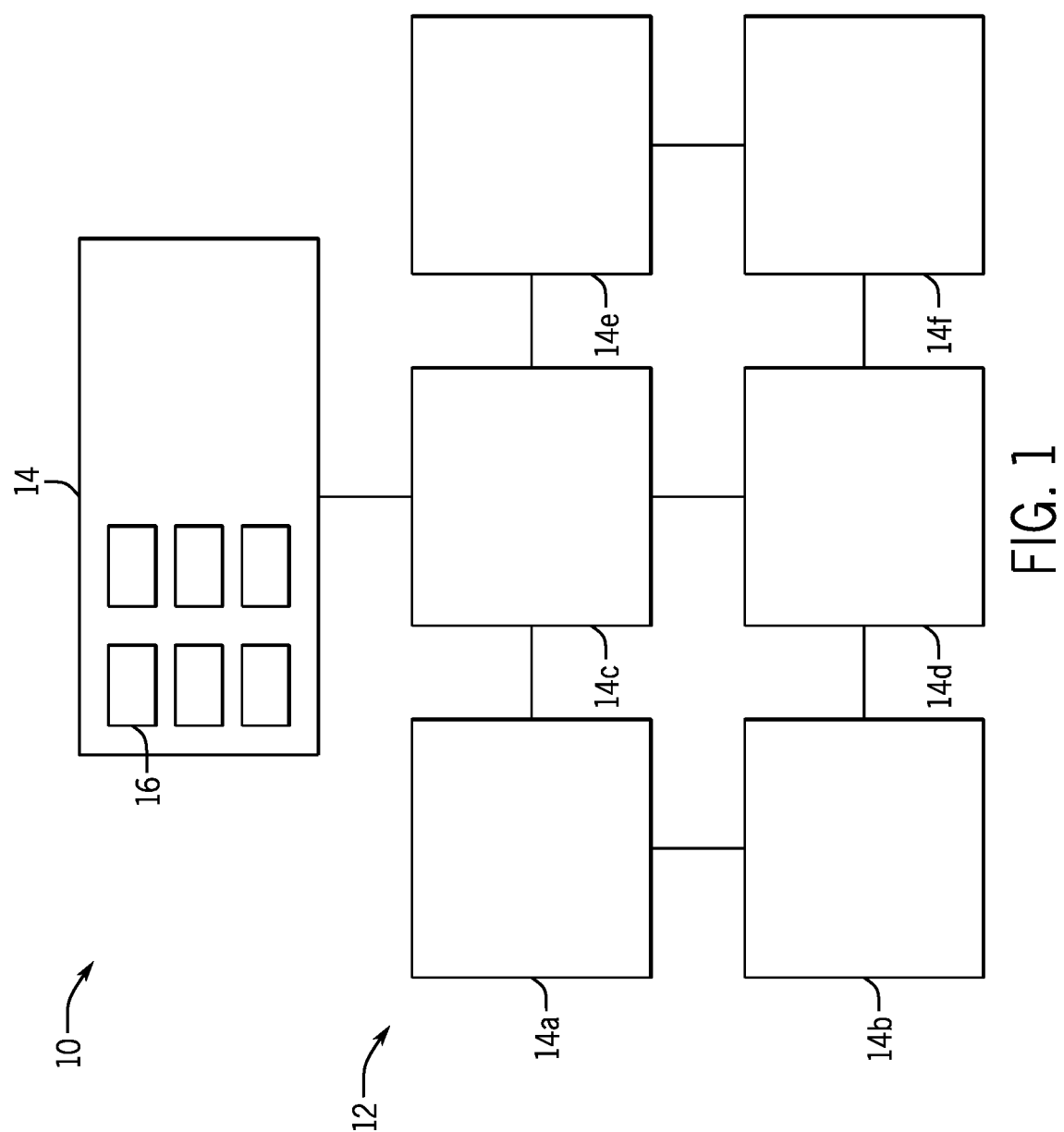
FIG. 1 is a block diagram of an interactive vehicle ride in accordance with present techniques.

The present disclosure is directed to an interactive game ride that includes features of a ride that provide audio, visual, and physical effects that can be experienced by riders in a vehicle, as well as features of a game, including player interaction with the various game effects and dynamic experiences based on the interaction. The interactive game ride is in contrast to passive rides providing a static experience for each rider, e.g., a passive ride does not include variable routes or outcomes each time the ride is taken and/or does not permit dynamic rider interaction with or control of physical features of the ride. The present techniques facilitate a potentially different experience for each vehicle and/or game player each time the ride is taken. Further, the game players may actively control the outcome of their physical environments. Further still, the interactive game ride couples player-controlled actions of virtual effects with physical outcomes. For example, if a projected virtual player avatar jumps on a lever (either real or projected), the lever actuates and a physical drawbridge may be opened. In another example, a physical activation of an effect, such as a fan, may blow debris out of the way, showing a hidden pathway. In this example, the debris may include projected or virtual debris that changes on a display in a manner that is coordinated with the physical effect. In this manner, the interactive game ride provides continued interest over several park visits.

The interactive game ride may allow storytelling with variable or unique narratives depending on the choices made by the game players. For example, such choices may include the selection of a particular game character to role-play or follow, the selection of objects within the game, speaking certain triggering phrases, etc. The interactive game ride may also provide an immersive video game type experience that allows players to experience their favorite games in a large scale setting. The interactive game ride may accommodate gamer players of varying levels or abilities, and may include game player (including multi-player) interaction to affect the ride path and story, both individually (i.e., for individual players) and collectively (i.e., multi-player play outcomes may influence the vehicle path or story narrative for all of the players in the game). Further, the interactive game ride may serve as a platform for a variety of game types, including first person shooter games, racing games, sports games, logic games, problem-solving games, puzzles, embedded narratives, etc. To augment the game experience, the game ride may also permit the players in individual vehicles or individual players (e.g., vehicle riders) within each vehicle to identify with a particular game character and experience the game as that character, i.e., role-playing. For example, an interactive game ride may permit players to select a character from a character menu or may facilitate character assignment to the players. The character may then be associated with a particular skill level or particular game goals. In certain embodiments, the game ride may assess or assign a skill level to each player and adapt accordingly.

In one embodiment, the game system itself may assume the role of the lead or main character, and the game players may select supporting characters (i.e., characters other than the main character). For example, a game may permit selection of supporting characters that play the game with the goal of advancing/helping or hindering the goals of the main character, depending on the game narrative. The individual and/or collective play of the game players in turn influences the story narrative presented for the main character by the game system, including the path and choices that the main character takes. In this manner, the individual rider-players may control their individual supporting characters, but as a collective vehicle group they may together control the main character that is seemingly leading their vehicle or otherwise directing the narrative. In other embodiments, the game players may assume the role of one or more main characters and experience the game ride as that main character. In further embodiments, other players may assume the role of supporting characters within the game as well. The character may also take the form of a particular character avatar that is projected within the game environments or displayed on a video screen.

The interactive game ride may also provide the benefit of a dynamic narrative that changes in response to interest from the game players. For example, if a family with small children is participating in the ride, the game may receive input on the player ages to select appropriate game environments. Alternatively or additionally, the player interactions with the game may also influence the game to provide feedback. In one example, the game is a series of puzzle rooms, and the actions that the players take within each scene or puzzle change the environment and allow different paths to be activated or different physical effects to take place.

As the players travel through the game, they may interact with the game via one or more game input devices that may, in certain embodiments, be provided as part of the game vehicle or may be provided as portable wireless devices. Such devices may be familiar game playing accessories, such as joysticks, steering wheels, wands, markers (e.g., controllers configured as weapons), etc. In the example of a game joystick, when the player is within the game, the joystick may control an avatar on a video surface of the game environment (e.g., on a wall, ceiling, or floor) and, based on the player's own control of the avatar, the game may dynamically adjust the game experience to reflect what the player has selected or targeted or where a player has moved on the video surface. For example, the selection may indicate a target that has been shot or a door that has been opened. In addition, the game input device may be used to interact with video, projection, display or surfaces that are part of physical objects in the game (e.g., interactive objects, barriers), and the game controller may be configured to determine the nature of the interaction from input from the input device, sensors on the surface, and/or external sensors such as cameras within the game system. In another embodiment, movement or action of the players may be sensed by various sensors with the game and used as inputs to the game. For example, if a player says a certain phrase, sensors within the environment may provide the sensed audio as an input to the controller to trigger particular game actions, where the game player statement of "yes" has a different game outcome than the statement of "no." Accordingly, the game may also include game player interaction with game characters, either animatronic characters or actors within the game. Such interactions may also provide dynamic inputs to the game to trigger changes within the environment depending on the outcome of the interaction.

The game controller, which may include one or more automation controllers, e.g., a programmable logic controller (PLC), is operatively connected to, communicates with, and/or controls operations of certain components of the system. For example, the game controller controls the display of images or videos on one or more game surfaces and, in certain embodiments, may also provide instructions to control certain aspects of a display within a game vehicle. In addition, the game controller is also configured to receive inputs from various game components, including game input devices, the game vehicles, the game environment features, sensors, etc., to control certain aspect of game play. In addition, in particular embodiments, the game controller may be configured to control individual vehicle motion for any vehicle in the game. For example, the interactive game ride system may be implemented with autonomous guided vehicles. In such embodiments, the vehicle path is determined via the game controller and the game player does not drive or steer the vehicle. However, game player interactions with the game may be provided as inputs to the game controller that influence not only the vehicle path, but may also trigger vehicle effects (e.g., noise effects, vehicle shaking or tilting, etc.). Further, in accordance with the present disclosure, the game controller may update or change a game configuration, either under game operator control or based on the skill or performance of the vehicle riders.

The disclosed interactive video game ride may be implemented with amusement park attractions including shows, rides, promotions, and so forth. By employing the interactive video game ride in conjunction with particular themes, such as traditional video games, guests are incentivized to visit the amusement park and are further enabled to enjoy the thematic experience provided by the amusement park. Further, because the interactive video game ride is configurable and dynamic, one game environment may be configured to host games having a number of different themes or narratives.

With the foregoing in mind, FIG. 1 illustrates an embodiment of an interactive game ride system 10 in accordance with the present disclosure. The interactive game ride system 10 may include a game environment 14 for one or more game vehicles 16. In the illustrated embodiment, multiple vehicles 16 are positioned within and configured to move in the game environment 14. The game environment 14 may generally refer to the locations within an arena 12 or building in which the game is played. In certain embodiments, the game environment 14 may include different locations (e.g., environments 14a-14f) that may be interconnected via passageways or doors. In other embodiments, the environments 14a-f may be separate sections of a larger arena 12. The game system 10 may permit or facilitate movement of one or more vehicles 16 within all or only a subset of the environments 14a-f depending on the game play. Further, each vehicle 16 may move together with other vehicles 16 or independently within the arena 12 such that the vehicles 16 visit different game environments 14a-f.

For example, in one example of game play, a first vehicle 16 may travel through environments 14a, 14c, and 14e while a second vehicle 16 may travel through environments 14c, 14b, 14d, 14f, and 14e. The game environments 14 may be configured for multiple vehicles 16 to play simultaneously or may be configured to hold only one or a few vehicles 16. Accordingly, a game in operation may feature vehicles 16 that converge at a particular location within the arena 12 to play together and then separate to accomplish individual game goals. In this manner, the system 10 may also be configured to maximize usable operation time for high-interest game environments 14 that may otherwise form a bottleneck to game play, and distribution of the vehicles 16 within the arena may be in part determined via one or more rules-based algorithms that use as input the desired number of vehicles 16 in a particular game environment 14, the desired length of vehicle time in the environment 14, the game goals of an environment 14, the recovery time for any physical effects, etc. Whichever vehicle path is assigned, for certain games, a linear story or narrative is presented that incorporates game player interactions, e.g., via selected game character avatars. The system 10 may store different narratives or outcomes that are activated based on the receipt of particular inputs. In certain embodiments, a game system 10 may have over 100 or over 1000 different possible narratives that may include variable vehicles paths, physical objects, physical effects, character interactions, etc. Each vehicle (or group of vehicles) experiences a particular linear narrative during the course of a single game. However, the narrative is dynamic and responds to input from the game players. Accordingly, the game narrative is not set at the beginning of the game such that the game players cannot predict how the game will unfold.

In certain embodiments, the system 10 may also determine the divergent vehicle paths based on the game play and inputs received from the players in the vehicles 16. The vehicles 16 may be player-driven and controlled or may be provided as autonomous guided vehicles that are controlled via a game controller. In the embodiment using guided vehicles, the vehicle paths are determined by the game controller and the players move within the arena 12 and to and from various game environments 14 without controlling the movement of the vehicles 16. The vehicle 16 may also include display functionality, and information about the vehicle path may be provided as part of a map display, which may also facilitate player driving of the vehicles 16. Such a display may include various features of the game and may be part of the game narrative. That is, the vehicle 16 may display a map that includes depictions of the game environments 14 that are selected by the controller for game play.

Figure 2:
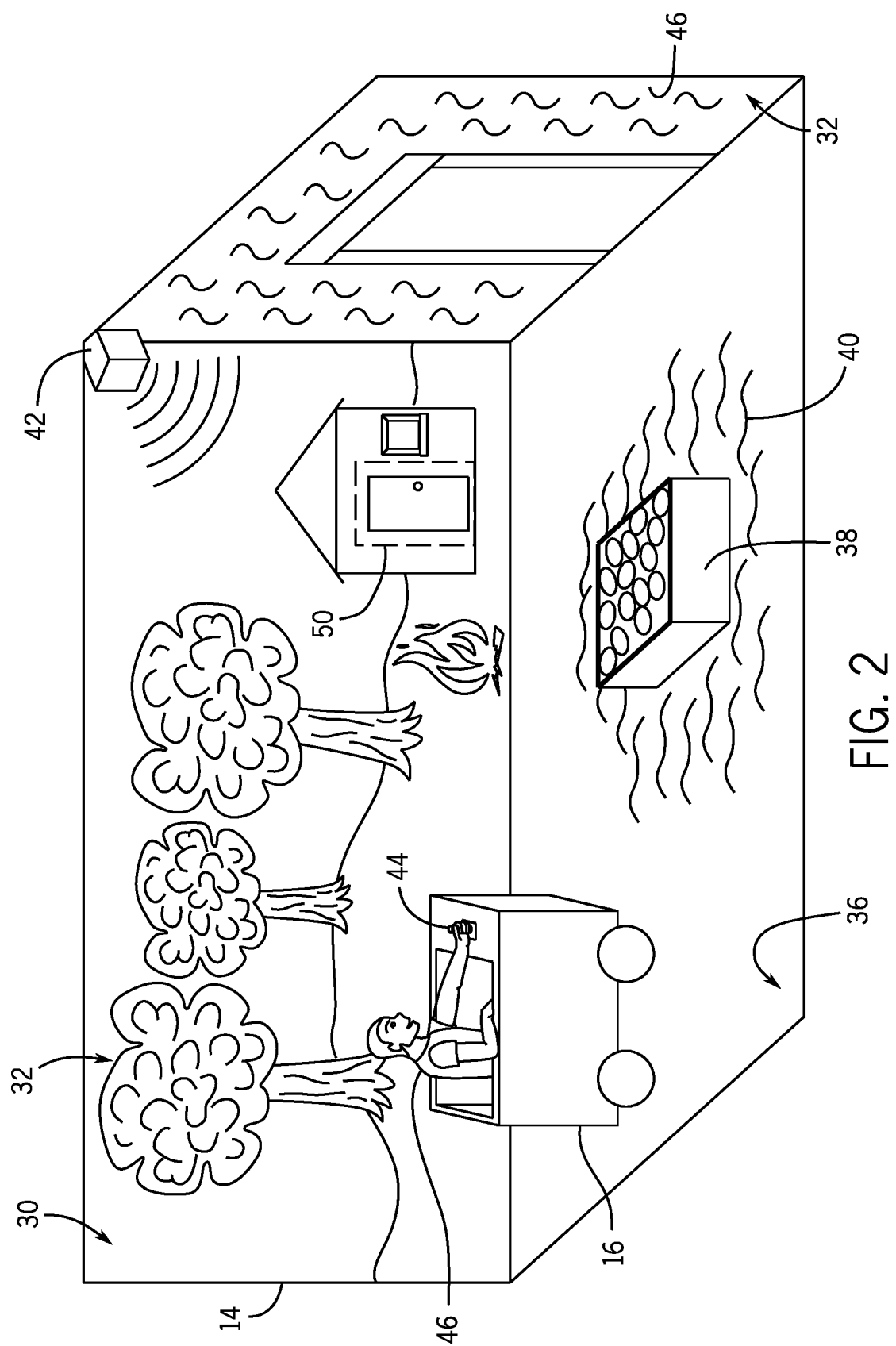
FIG. 2 is a perspective view of a vehicle in a game environment in accordance with present techniques.

Individual game environments 14 may include one or more features that enhance the game experience and that are interactive. Player interaction with these features dynamically changes the course of the game. For example, in one embodiment, certain vehicles 12 may experience entirely different paths as well as game narratives and challenges relative to other vehicles in the game and/or relative to other times that the game is experienced. In this manner, each experience with the game is tailored to the player or group of players. FIG. 2 is a perspective view of a game environment 14 that includes virtual game features such as those provided by a projection or video display 30. The video display may include various selectable virtual displayed features 32 that are capable of being selected by a game player (e.g., player 46). In certain embodiments, the display may be part of the walls, ceiling, and/or floor 36, depending on the desired environment 14 of the game. The environment 14 may also include interactive physical objects 38, e.g., surface features that can reflect projections in accordance with the environment, that form dynamic physical barriers, visual interest, or that may be activated upon accomplishment of a game goal. For example, a pot of gold may emerge from the floor under mechanical control if a certain game goal is accomplished. Alternatively, a barrier may be imposed or lifted based on game play. Such physical objects 38 may also include animatronic figures. In one embodiment, an animatronic figure may deliver different audio messages to game players 46 depending on their game play. In this manner, the animatronic figure may reward high skill players 46 or provide clues to lagging players 46 to help them catch up to other players in the game. The animatronic figure or other physical objects 38 may be configured to be controlled via the game controller, which provides instructions to indicate that a vehicle 16 is within a distance range to activate certain motion actions.

The game environment 14 may also be configured to activate certain special effects 40, such as, for example, smoke or water effects. Other physical effects may include snow, fire, wind, ice, temperature effects, smells, etc. The special effects 40 may be augmented by video displays 30. For example, a water wall effect may include some physical water that is backed by a video display such that the player 46 is under the impression that they are passing through a waterfall without uncomfortably soaking the players. The game environment 14 may also include various audio effects delivered via one or more speakers 42. An operator interface 44 controls player interaction with the game environment 14 and may include, for example, one or more player input devices such as a steering wheel, brake and gas pedals, a joystick, a display screen, one or more buttons, a gun, etc. Selection box 50 on the video display 30 indicates the player selection via joystick or other input device. For example, selecting a door may trigger game controller activation of an adjacent game environment 14 that resembles the interior of a cottage and automatic guidance of the vehicle 16 into the appropriate environment 14. Passing through the environment 14 without selecting the door maintains the game environments in exterior settings.

Figure 3:
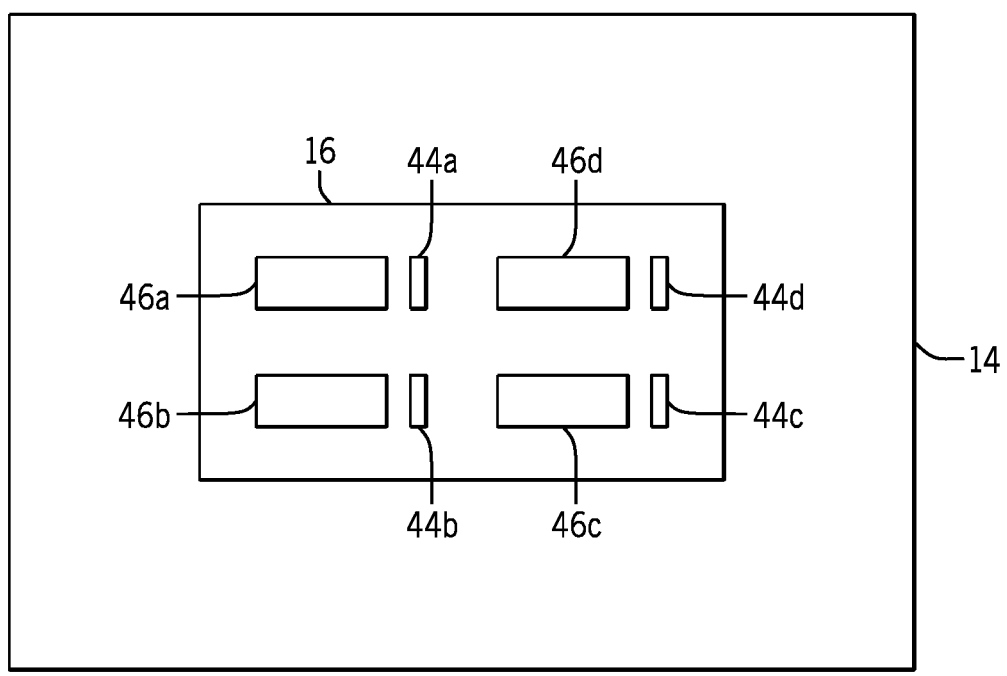
FIG. 3 is a block diagram of multi-player vehicle in a game environment in accordance with present techniques.

In certain embodiments, when multiple players 46 are present in a single vehicle 16, the vehicle 16 may include multiple interfaces 44, as shown in FIG. 3. Each interface 44 permits different inputs to the game. In one embodiment, the players 46a-46d are associated with different game characters. Accordingly, each player 46 may have different game goals and/or different operator interfaces 44a-44d. For example, in a wizard-themed game, each operator interface 44 may represent a different wand associated with each character. The wands may be the players' own wands, and, in such embodiments, the game system 10 may link to the wands before the game start to configure game play and to authorize individual wands to interact with the game environment 14. Unauthorized wands would have no effect or ability to interact with features in the game system 10.

Further, depending on the type of game configuration, the players 46a-46d may be competing on opposing teams or may be working together to accomplish a joint goal. For team-based play, the vehicles 12 may be scored individually as well as cumulatively. The various operator interface inputs may be pooled for a total vehicle score or may be arbitrated to the highest or lowest player ability to determine the vehicle path and/or game play or the influence an unfolding story. For example, depending on the game play, additional clues, plot points in the narrative, or avatar interactions may be revealed. In one embodiment, superior game play may reveal tie-in information to a game theme, such as movie release information or may reveal introduction of a particular character within the game theme In another embodiment, some game play may reveal clues or hints to let novice players catch up to more experienced players.

Figure 4:
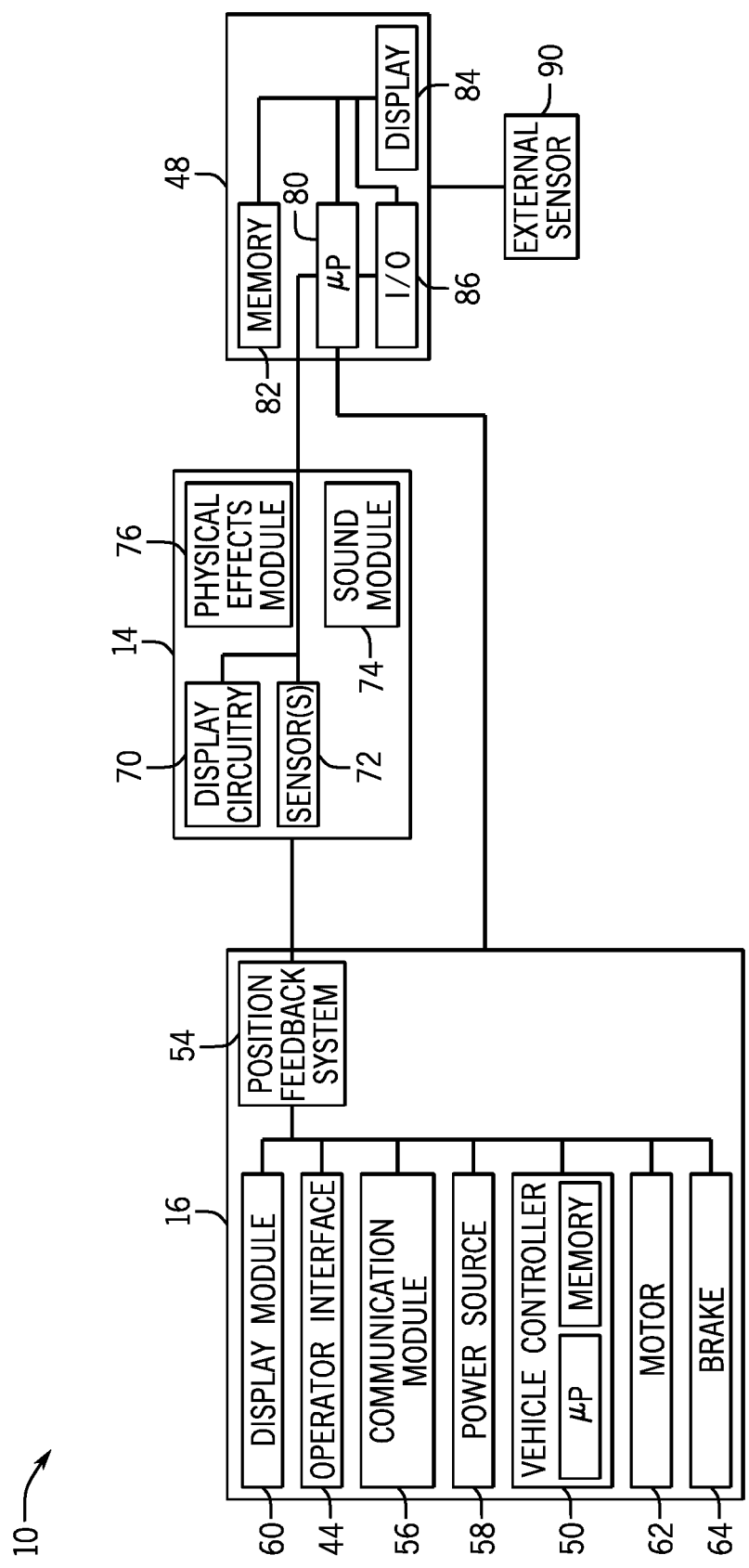
FIG. 4 is a block diagram of an interactive vehicle ride system in accordance with present techniques.

As illustrated in FIG. 4, the system 10 includes a game controller 48 that is communicatively coupled to the vehicle/s 16 and the game environment 14. As shown in FIG. 4, which is a block diagram of the system 10, the techniques disclosed herein may be used in conjunction with one or more components of the system 10, including the vehicles 16, the game environment 14, and the game controller 48. To provide movements of an individual vehicle 16, the vehicle 16 includes a motor 62 and a brake 64. The movements of the vehicle 16 may include running (e.g., acceleration, deceleration), turning, and stopping of the vehicle 16. The motor 62 may be powered by any suitable power source 58, including, but not limited to, a battery, a solar panel, an electrical generator, a gas engine, or any combination thereof. The operations of the motor 62 and the brake 64 may be controlled by the vehicle controller 50. For example, the vehicle controller 50 may control the motor 62 to adjust its output power to accelerate or decelerate the vehicle 16. The vehicle controller 50 may also control the brake 64 to decelerate or stop the vehicle 16. Further, the vehicle controller 50 may operate under instructions from the player via the operator interface 44 (e.g., to steer the vehicle based on operator control of a steering wheel or joystick) and/or from the game controller 48.

The vehicle 16 may include a position feedback system 54 for monitoring its position in the game environment 14. In one embodiment, the position feedback system 54 interacts with one or more sensors or tags in the game environment 14. In such an embodiment, the vehicle position feedback system 54 includes a reader that may sense the sensors or tags to provide the position information of the vehicle 16. The reader then supplies the position information to the vehicle controller 50, which in turn provides the information to the game controller 48. The vehicle 16 may include a communication module 56 to facilitate communication with the game controller 48 and to facilitate transmitting information from the operator interface 44 related to game specific inputs (e.g., game environment interactions) and receiving information related to autonomous vehicle guidance and controlled vehicle paths. In this manner, the game controller 48 may control movement of the vehicles 16 in the system 10. Based on feedback from the game controller 48, the vehicle 16 may also display game information via a display module 60 coupled to a display screen. Game information may include a vehicle score as well as a team score, a representation of the game environment 14 (e.g., a 2D dynamic graphical display including the current game configuration and vehicle positions in the game environment 14 as well as any available interactive displayed elements 32).

The game controller 48 and the vehicle controller 50 may include various components that may allow for interaction of the players 46 with the vehicle 16 and the game environment 14. Further, the game environment may include separate control circuitry for facilitating interactive and dynamic game elements, including display circuitry 70 for the video display 30, tags or sensors 72 for tracking the vehicle 16 and/or the input device of the operator interface 44, a sound module 74, and a physical effects module 76 for controlling one or more physical effects (e.g., special effects 40 and/or physical objects 38; see FIG. 2). One or more disclosed features of the game environment 14 may alternatively be implemented in the vehicle 12, e.g., the speakers may be part of the vehicle 12 but controlled via the game controller 48 and/or the vehicle controller 50

While certain elements are discussed in the context of the game controller 48, it should be understood that the vehicle controller 50 and the game environment 14 may include similar components. For example, the vehicle controller 16 may be any device employing a general purpose or an application-specific processor 80. The vehicle controller 16 may also include a memory device 82 for storing instructions executable by the processor 80 to perform the methods and control actions described herein for the vehicle 16. The processor 80 may include one or more processing devices, and the memory 82 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 80 or by any general purpose or special purpose computer or other machine with a processor. In addition, the game controller 48 may be configured to communicate over wired or wireless communication paths with the game environment 14 and the vehicle 16. The game controller 48 may include a distributed control system (DCS) or any computer-based workstation including a display 84 and an input/output interface 86 that is fully or partially automated.

In one embodiment, data is transferred between the game controller 48, the game environment 14, and the vehicle controller 50 at least in part via a wireless network. The vehicle controller 50 may transfer data indicative of the status of the vehicle to the game controller 48. Such data may include a vehicle identifier for an individual vehicle 16 and associated position, velocity, impact zone, traveling direction, motor output power, loading condition, or the like.

Based on the received data from the vehicle controller 50, the game controller 48 may send instructions to the vehicle controller 50 to control the movement of the vehicle 16. In accordance with the present disclosure, the game controller 48 may control each of a plurality of ride vehicles 16 independently.

The system 10 may determine vehicle position and game player interaction via the position tracking system 54 that interacts with the tags or sensors 72 on or in the game environment 14 or other suitable techniques for determining vehicle position. For example, the system 10 may include an external sensor 90, such as a camera, that tracks the positions of the vehicles 16 and provides data to the game controller 48. In addition, the vehicle 16 may include transmitters, such as RFID transmitters, that provide signals to the game controller 48 and that may be used to determine position information. Further, while the disclosed embodiments have been described in the context of vehicles 16, in other embodiments, the game players 46 may interact directly with the game environment 14. In such an embodiment, game players may wear watches or other objects that can incorporate position indicating devices. Alternatively, player location may be determined via the external sensor 90.

In operation, the game system (e.g., the game ride system 10 of FIG. 4) starts the game and the vehicles 16 progress through the game environments 14. Their movement within the larger arena 12 of the game and to and from the individual environments 14 may be determined dynamically based on game play. This is in contrast to passive rides in which all ride participants travel in a fixed path within an attraction. As provided herein, the interactive game ride permits and facilitates different paths within the game ride and/or different game experiences based on game play. Accordingly, the progress of the game is not fixed at the beginning, but is in response to the players themselves and their interaction with the game features.

Figure 5:
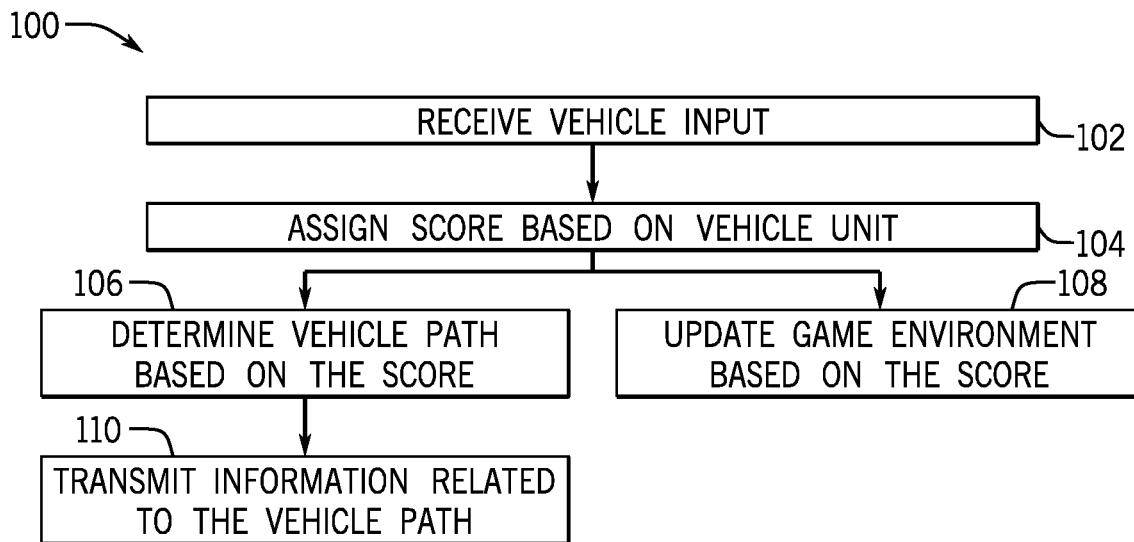
FIG. 5 is a flow diagram of a method for vehicle path determination based on game play in accordance with present techniques.

The interactive game ride system FIG. 5 is a flow diagram of a method 100 of assigning vehicle paths to one or more vehicles 16 based on their vehicle paths during game play. The method 100 may be performed entirely or in part by a game controller 48 as provided herein using control logic or programming (e.g., via controller 100). At block 102, a controller 48 receives one or more signals or inputs from a vehicle 16 with interactive game input information. The information may be information from an operator interface 44 and/or a display screen 30. For example, the information may be a position and/or angle of a joystick, a button actuation, a trigger pull, etc. The information may also include vehicle position information via the position feedback system 54. In one embodiment, the controller 48 may receive information that a trigger has been pulled from a particular game environment position. Further, the controller 48 may also determine if a target has been hit based on an optical signal (e.g., an optical source in the gun barrel may shine onto a target, and a light sensor in the target may provide information that the light detection is consistent with a game target hit) or other signal. Player actions may be received via the operator interface and data related to the actions may be stored and/or transmitted to the controller 48 for further processing, such as score determination at block 104. In certain embodiments, the score input may include input from external sensors 90 that capture player motion, such as wand motion, and provide the motion characteristics as input to a score determination algorithm. If the wand motion is associated with a particular spell that is an effective spell for the game, the player's score may be updated to indicate a successful "freezing spell" or other spell has been cast. Additional score input may also include information from video displays and sensors in the game environment 14. For example, selection of particular objects in the video display 30 may be received by the game controller 48 and provided as score input. Based on the vehicle score, the method 100 may assign a vehicle path in the game at step 106 as well as modifying or updating the existing game environment at step 108 to reflect the actions of the players and the score or similar action tally. For example, if the player 46 selects a door, the game environment 14 may be updated via the controller 48 to display an opened door rather than a closed door. Once the path is assigned, the controller 48 communicates the path information to the vehicle 16 (e.g., to the vehicle controller 50). The method 100 tracks the progress of the game and the scores of particular vehicles 16 and/or riders 46 by returning to step 102 to process new position information as the vehicles 16 progress in the game environment 14 during game play.

Figure 6:
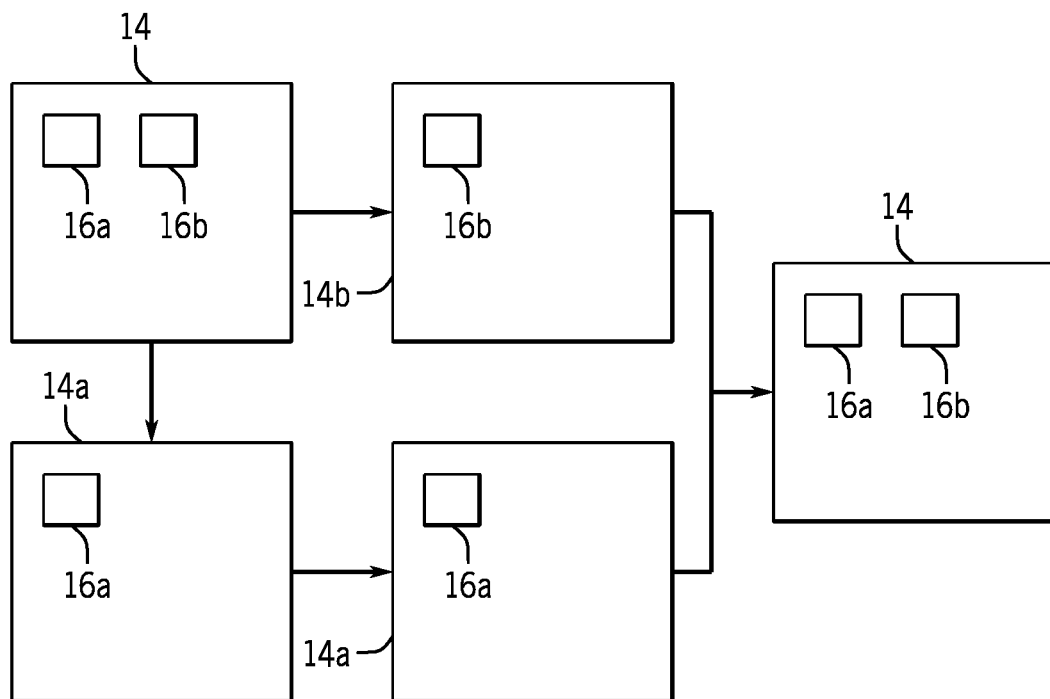
FIG. 6 is a block diagram of a multi-path game in accordance with present techniques.

FIG. 6 is an example of vehicle path assignment that may be implemented via the method 100 of FIG. 5. For example, both vehicles 16a and 16b in the game start in the same environment 14. The vehicles then interact (e.g., via the operator interface 44) with the game environment 14 and information about the interaction is received by the game controller 48. Based on the information, as well as additional information (e.g., selected characters, selected play difficulty), the game controller 48 provides path information to the vehicles 16. For autonomous guided vehicles, the vehicle controller automatically controls the vehicle path 16, including the speed of the vehicle 16 within the game as well as direction, speed and degrees of rotation of vehicle, vehicle starting stopping, backing up, etc. In one embodiment, vehicle 16a may be associated with the Character A while vehicle 16b is associated with Character B. Vehicle 16a may select a pathway by maneuvering a selection within a control and clicking on a fork in the path illustrated on a display screen. Based on the selection, the vehicle 16a progresses to environments 14a. Similarly, the vehicle 16b may select a different path, and the vehicle 16b then progresses through the environments 14b. Depending on the game, the vehicles 16a and 16b may come together in another game environment 14 before exiting the game. In some embodiments, the players in different vehicles 12 are competing with each other to proceed on a desired or winning path. In other embodiments, players in multi-player vehicles follow multiple characters, each player focused on providing input/control to his/her own character.

Figure 7:
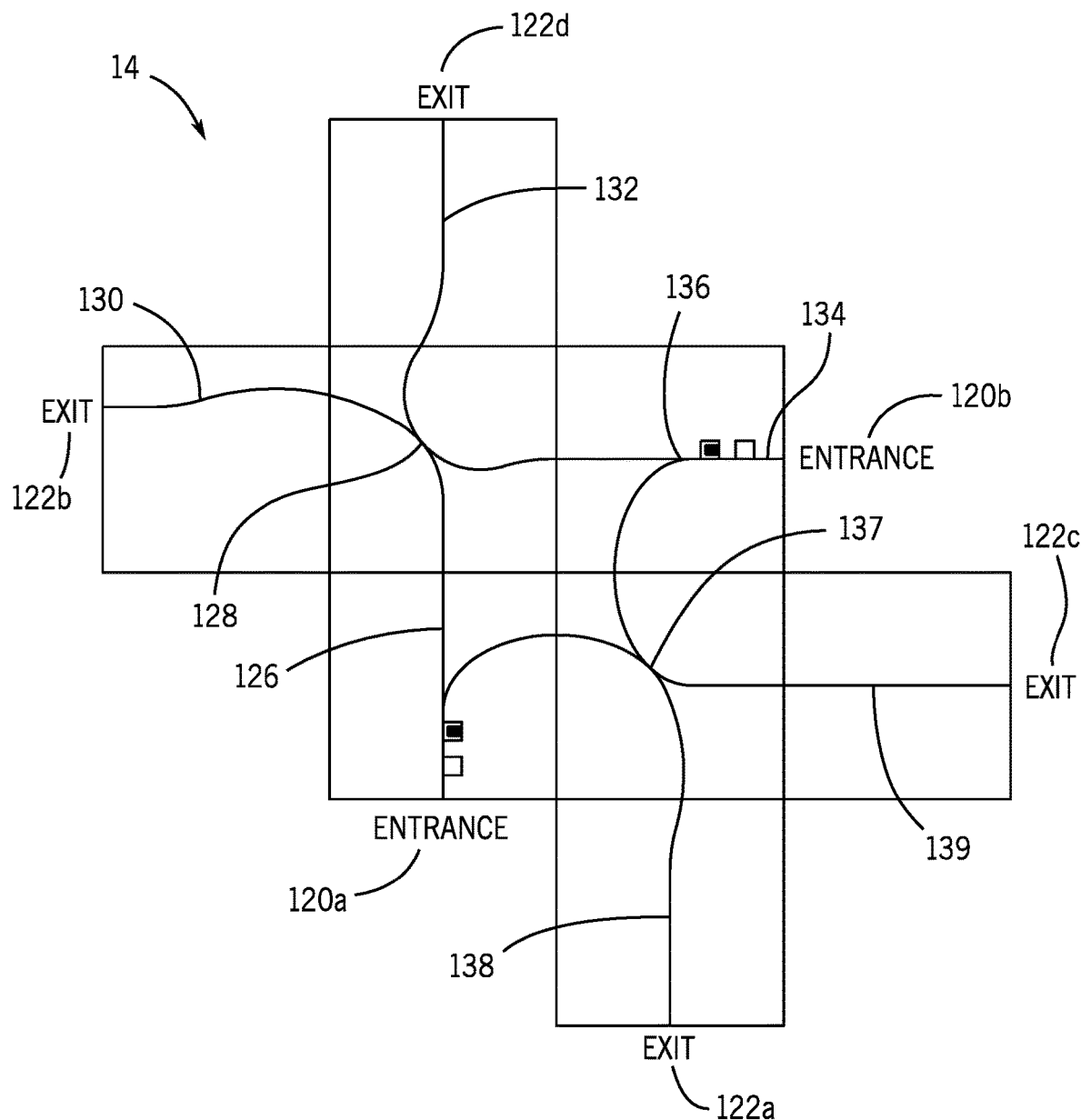
FIG. 7 is a schematic diagram of a multi-path game in accordance with present techniques.

FIG. 7 is another example of vehicle path assignment within an environment 14 that may be implemented via the method 100 of FIG. 5. For example, the environment 14 may include a plurality of entrances 120 (e.g., entrances 120a and 120b) and exits 122 (e.g. exits 122a-d). Based on predetermined factors, a vehicle entry into the game may be assigned to a particular entrance 120. In one embodiment, a repeat player may be assigned to a new entrance 120 at each visit. In another embodiment, a repeat player may "unlock" access to new entrances via game skill or achievements. Other entrance assignment factors may include assessed skill level, age, or character assignment (e.g., a particular game character may be assigned a preset entrance while other characters use their own designated entrances) or cumulative "score" or performance level of all players in the same vehicle. For example, in one embodiment, repeat game players who have achieved a particular skill level may have certain hidden or special characters available as options upon reaching a cumulative score threshold over the course of many game plays. The environment 14 may include certain character training rooms that only vehicles associated with a particular character may enter. For example, a character training room may be located just within an assigned character entrance 120.

Once within the environment, the game may progress as the player vehicles advance within the environment 14, e.g., as the players enter a room and interact with the game environment 14. Certain locations in the game may trigger path forks. For example, a vehicle on a path 126 may reach a path junction 128 where game play may determine if the player exits on a path 130 to the exit 122b or on a path 132 to the exit 122d. For example, if a game goal is achieved, the vehicle may be instructed to progress on path 130 to a higher-level location. Alternatively, if the game goal is not achieved, the vehicle may progress on the lower-level path 132. Accordingly, the paths may represent paths through environments associated with different skill levels. The paths may also present different options depending on player interest. For example, the player/s in the vehicle may choose whether a path through a dungeon or a kitchen is more interesting, and may be permitted to choose any path regardless of skill level. In the depicted configuration, other paths may progress through other game locations. A path 134 may progress to a path junction 136, which may then fork either towards the junction 128 or the junction 137, which in turn may fork into the path 138 and the path 139. These paths may represent other features. For example, in a castle game, the various paths may progress through throne room or bedroom game environments. It should be understood that the depicted paths are by way of example, and other environment configurations may be selected based on the desired game goals. Certain paths may be longer and more complex than others, and may be associated with longer game run times. Further, the game may be played such that different vehicles enter via various entrances at the same time and such that vehicles may converge within the game and then move apart, depending on their game play. In other examples, other vehicles may be playing the same game but may never encounter one another because their paths never converge.

Figure 8:
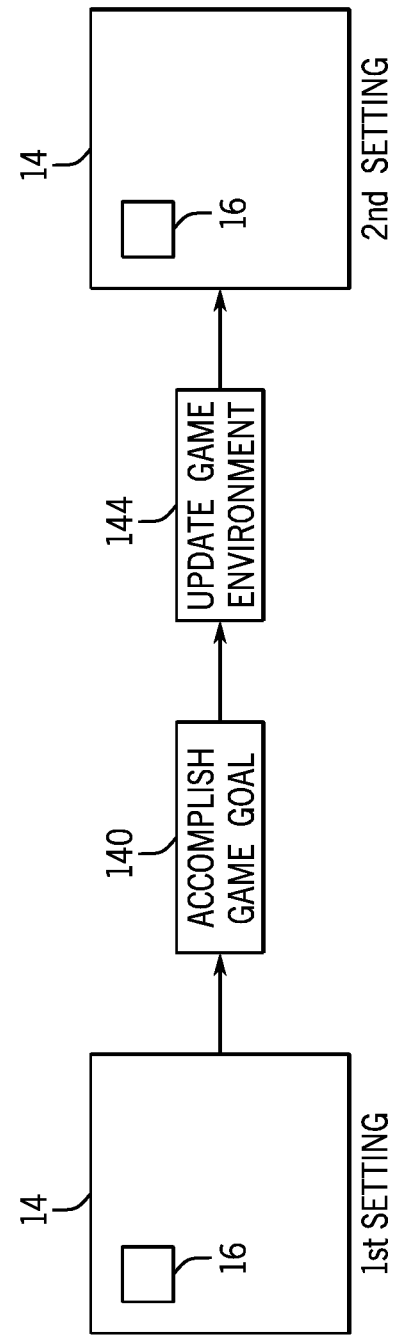
FIG. 8 shows a transition between different game settings in a game environment in accordance with present techniques.

In addition to controlling the progress of vehicles in the game via different game environments 14, the system 10 may be reconfigured by changing the displayed images in a single environment. FIG. 8 is an example of a game environment 14 that transitions from a first setting to a second setting. In some embodiments, the information from or associated with the vehicle 16 indicates that a certain game goal was accomplished (block 140) and triggers an update to the second setting (block 144). In this manner, the game system 10 may change the game in essentially real-time in response to game play. In one embodiment, such transitions may include screens that provide messages that indicate that different levels have been passed.

Figure 9:
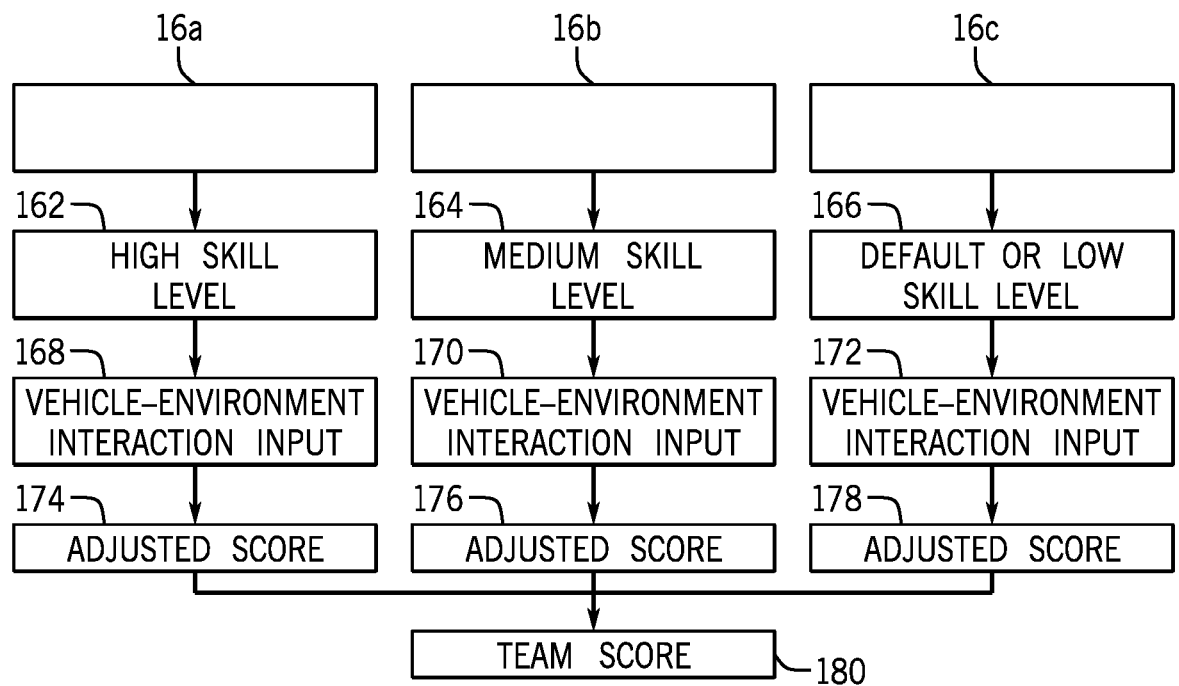
FIG. 9 is a flow diagram of a method for determining a game score based on player skill level in accordance with present techniques.

As provided herein, the game system 10 may incorporate player skill information in determining scores and/or environment updates. FIG. 9 shows a method 160 that accounts for player skill within the game. For example, in a multi-vehicle team game, each vehicle 16 (vehicles 16a-16c) may have associated players 46 with different skill levels, including high skill (block 162), medium skill (block 164) and low skill (block 166) players. The skill levels may be determined via player self-evaluation or from previous game play information, e.g., if the game player is a repeat visitor, game scores from earlier park visits may be stored on a visitor card or pass. In certain embodiments, the skill levels may be determined in a testing environment or in an initial game environment 14. Accordingly, the game system 10 may dynamically adapt to players with different skill levels. For a novice player, the low skill level may also include a default setting that allows such a player to experience the game ride as a ride without interacting with the game environment 14. Based on the interactions with the game, the system 10 may weight the game scores (or the environmental updates) according to skill level to yield adjusted scores (e.g., scores 174, 176, and 178). Further, the scores may be combined in a total team score 180. In other embodiments, the game ride may not be score-focused (i.e., may not provide scores), but may instead be about accomplishing a mission that resolves a story goal. For example, the game may direct players to catch a villain, find a treasure, solve a mystery, etc.

Figure 10:
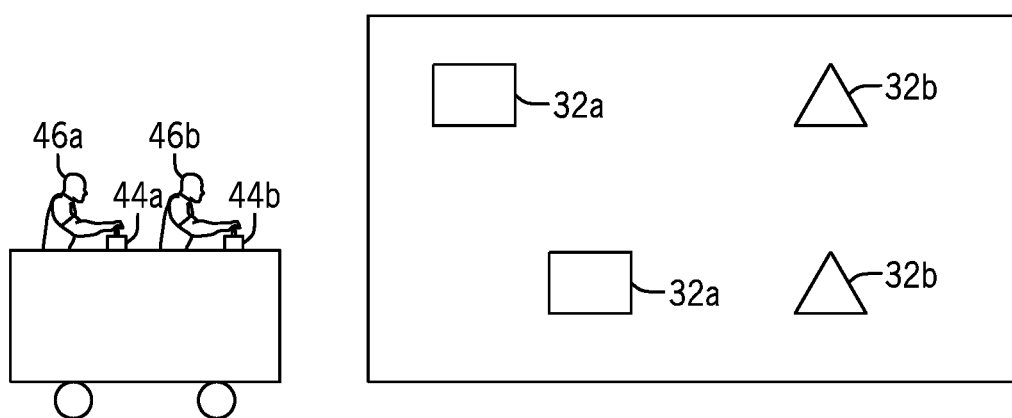
FIG. 10 is a side view of game features assigned to different players in accordance with present techniques.

FIG. 10 shows an embodiment of a game environment 14 that includes interactive elements that are specific for certain game players. The elements 32a are associated with the player 46a, and the elements 32b are associated with the player 46b. Such distinctions may be based on the character and/or the skill levels of the players 46. When the player 46a attempts to interact with the elements 32b, there is no response, e.g., the controller 48 does not receive any input from the attempted interaction. Alternatively, the game system 10 may be configured to indicate a penalty associated with such attempts.

In another embodiment, the game system 10 may track the game experience of the players. For example, an amusement park may track player progress over the course of park visits in various games, e.g., via a card or mobile device. When a player or group of players returns to a game, the game controller 48 may select a game display based on previously played games. In this manner, a single game location is capable of providing challenges for more experienced players as well as novice players. For example, a new game level and ride experience may be played and experienced on each return visit. Further, for games played with a mix of player skill levels, the game controller 48 may introduce additional challenges for more advanced players. The game system 10 may also track player performance on home or online game versions associated with the in-park ride game and respond and adjust accordingly.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A method comprising:
   receiving one or more inputs from a plurality of vehicles in a game environment;
   assigning scores or game narratives to each individual vehicle based on the one or more inputs;
   assigning a vehicle path within the game environment to each individual vehicle of the plurality of vehicles based on the score or assigned game narrative of the respective individual vehicle, wherein assigning the vehicle path to an individual vehicle comprises assigning a first vehicle path if any individual vehicle score of the plurality of vehicles is above a threshold and assigning a second vehicle path if the score of all individual vehicles scores are below a threshold; and
   transmitting information related to the respective vehicle path to the corresponding individual vehicles.

2. The method of claim 1, comprising updating the scores based on new inputs from the plurality of vehicles and assigning an updated vehicle path based on the updating.

3. The method of claim 1, wherein assigning the vehicle path to the individual vehicle comprises assigning the first vehicle path if the individual vehicle score is above the threshold and assigning the second vehicle path if the individual vehicle score is below the threshold.

4. The method of claim 1, comprising providing instructions to modify a game environment based on the scores or the game narratives, and wherein modifying the game environment comprises modifying a virtual or physical object within the game environment.

5. The method of claim 1, comprising activating a first setting of the game environment when the scores are above the threshold and a second setting of the game environment when the scores are below the threshold.

6. The method of claim 5, wherein the first setting comprises a first portion of a game story and the second setting comprises a second portion of a game story.

7. The method of claim 6, wherein the first setting comprises a first set of game environment features and the second setting comprises a second set of game environment features, wherein the first setting and the second setting are associated with the same location in the game environment.

8. The method of claim 1, wherein the vehicle path defines a path within the game environment associated with a subset of rooms in the game environment.

9. A method comprising:
receiving one or more inputs from one or more riders of a vehicle in a game environment;
assigning scores to each rider of the one or more riders based on the one or more inputs;
assigning a vehicle path within the game environment to the vehicle based on a vehicle score for the vehicle, wherein the vehicle score is based at least in part on the scores of the one or more riders;
assigning a skill level to each rider of the one or more riders;
determining weighted scores for each rider of the one or more riders based at least in part on the skill level of each rider of the one or more riders, wherein the vehicle score is based at least in part on the weighted scores of the one or more riders; and
providing instructions to move the vehicle along the vehicle path.

10. The method of claim 9, wherein the vehicle score is based at least in part on a cumulative weighted score of each rider of the one or more riders.

11. The method of claim 9, wherein the vehicle score is based at least in part on a highest individual weighted score assigned to an individual rider of the one or more riders.

12. The method of claim 9, providing the respective inputs from the one or more riders based at least in part on external motion sensors disposed within the game environment.

13. The method of claim 9, wherein the skill level is assigned based at least in part on scores associated with the respective rider during previous ride experiences.

14. The method of claim 9, comprising assigning a game character to the vehicle based on a game character selection of the one or more riders, wherein the game character is selected from a plurality of game character options, and wherein the game character options are presented based on the skill level assigned to each rider of the one or more riders.

15. The method of claim 14, comprising providing instructions to modify the game environment based on the game character assigned to the vehicle, and wherein modifying the game environment comprises modifying a virtual or physical object within the game environment.

16. A system comprising:
a plurality of vehicles configured to accommodate one or more riders in a game environment, wherein each vehicle of the plurality of vehicles comprises vehicle interface circuitry responsive to inputs from the one or more riders; and
a game controller configured to:
receive one or more inputs from the plurality of vehicles;
assign scores or game narratives to each individual vehicle based on the one or more inputs;
assign a game character to each individual vehicle based on a game character selection of the one or more riders, wherein the game character is selected from a plurality of game character options, and wherein the game character options are presented based on a skill level of the one or more riders;
assign a vehicle path within the game environment to each individual vehicle of the plurality of vehicles based on the score or assigned game narrative of the respective individual vehicle; and
transmit information related to the respective assigned vehicle path to each individual vehicle.

17. The system of claim 16, wherein the information related to the respective assigned vehicle path causes each individual vehicle to travel along the respective assigned vehicle path.

* * * * *